(12) United States Patent
Kodama et al.

(10) Patent No.: US 6,476,942 B1
(45) Date of Patent: Nov. 5, 2002

(54) PROCESS FOR PRODUCING ORIGINAL HOLOGRAM FILM

(75) Inventors: Daijiro Kodama; Masachika Watanabe; Hiroyuki Otaki, all of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/502,790

(22) Filed: Feb. 11, 2000

(30) Foreign Application Priority Data

Feb. 12, 1999 (JP) .......................................... 11-034587

(51) Int. Cl.[7] .................................................. G03H 1/00
(52) U.S. Cl. ........................ 359/1; 359/3; 430/1; 430/2
(58) Field of Search ............................ 359/1, 3; 430/1, 430/2; 283/86

(56) References Cited

U.S. PATENT DOCUMENTS

| | | | | |
|---|---|---|---|---|
| 3,639,031 A | * | 2/1972 | Lin .................................. | 359/3 |
| 4,959,283 A | * | 9/1990 | Smothers ........................ | 430/1 |
| 5,182,180 A | * | 1/1993 | Gambogi ........................ | 430/1 |
| 5,475,038 A | * | 12/1995 | Skoultchi ...................... | 522/96 |
| 5,499,118 A | * | 3/1996 | Wreede ........................ | 359/12 |
| 6,077,908 A | * | 6/2000 | Yahiro ......................... | 525/218 |
| 6,097,514 A | * | 8/2000 | Nishikawa .................... | 359/12 |

FOREIGN PATENT DOCUMENTS

| | | |
|---|---|---|
| JP | 10-340038 | 12/1998 |
| JP | 2000-137427 | 5/2000 |

* cited by examiner

*Primary Examiner*—Cassandra Spyrou
*Assistant Examiner*—Leo Boutsikaris
(74) *Attorney, Agent, or Firm*—Parkhurst & Wendel, LLP

(57) ABSTRACT

In order to prevent decrease in diffraction efficiency that is brought about when the diffraction peak wavelength shifts due to, for example, the shrinkage of a volume-hologram-recording photosensitive material layer 1, the present invention provides an original volume hologram film 10. The original volume hologram film 10 has a volume-hologram-recording photosensitive material layer 1 provided on a film 2, and an adhesive layer 8 provided on a film 9. The films 2 and 9 are affixed to each other with the layer 1 and 8 facing each other. The volume hologram has been recorded in the layer 1. The layer 8 can migrate an ingredient to the layer 1 to shift the diffraction peak wavelength to the opposite side.

10 Claims, 2 Drawing Sheets

PROCESS FOR PRODUCING ORIGINAL HOLOGRAM FILM

BACKGROUND OF THE INVENTION

1. Field of the Invention

The present invention relates to a process for producing an original hologram film. More particularly, the present invention relates to a process for producing an original hologram film free from decrease in diffraction efficiency that is brought about when the wavelength at which the diffraction efficiency of a hologram reaches its peak (hereinafter referred to as the diffraction peak wavelength) shifts due to, for example, the shrinkage of a volume-hologram-recording photosensitive material; to such an original hologram film; and to a hologram duplication process using the same.

2. Description of the Related Art

Heretofore, it has well been known that a volume hologram capable of being regenerated by white illuminating light is recorded by allowing scattered light from a light-scattering object and a reference wave to interfere in a volume-hologram-recording photosensitive material. Also well known is the following process for duplicating an original volume hologram (hologram duplication process): a volume-hologram-recording photosensitive material is superposed on a reflection- or transmission-type volume hologram (original hologram), and laser light is allowed to enter into this combination either from the photosensitive material side or from the original hologram side, thereby allowing the incident light and the light diffracted by the volume hologram (original hologram) to interfere in the photosensitive material to duplicate therein the original volume hologram.

When a photopolymer or the like is used as the photosensitive material for recording a volume hologram, the following may occur. Namely, the photosensitive material shrinks after the volume hologram has been recorded, and the spacing of the interference fringes recorded in the photosensitive material decreases; consequently, the diffraction peak wavelength shifts to the shorter wavelength side. For this reason, when it is tried to duplicate such a volume hologram by using a duplicating beam whose wavelength is the same as that of the photographing beam which is used when an original hologram is made, the diffraction efficiency is decreased, and it becomes difficult to efficiently duplicate the original hologram.

In order to compensate for the shift of the diffraction peak wavelength that is brought about due to the shrinkage of the photosensitive material, the correction of angle has conventionally been made by making the incidence angle of the duplicating beam smaller than that of the reference beam used for recording the original hologram so that the wavelength of the duplicating beam will agree with the diffraction peak wavelength.

However, when the diffraction peak wavelength for the original hologram is corrected by means of the above-described correction of angle, the visible area of the hologram duplicated may be restricted (see Japanese Patent Application No. 75498/1998 (Japanese Patent Laid-Open Publication No. 340038/1998)). Moreover, depending on the quantity of the shift, there may be such a case that it is impossible to make such a correction.

In the light of the foregoing problems, the present invention has been accomplished. An object of the present invention is therefore to provide a process for producing an original hologram film free from decrease in diffraction efficiency that is brought about when the diffraction peak wavelength shifts due to, for example, the shrinkage of a volume-hologram-recording photosensitive material. Another object of the present invention is to provide such an original hologram film. A further object of the present invention is to provide a hologram duplication process using this original hologram film.

SUMMARY OF THE INVENTION

We have already described the following in the specification of Japanese Patent Application No. 308675/1998 duly filed with the Japanese Patent Office. Namely, it is possible to obtain a reconstructed beam whose wavelength is almost the same as that of a recording beam by incorporating, into an adhesive layer, the same migrating ingredient as that incorporated into a volume-hologram-recording layer made from a photopolymer, thereby preventing change of the migrating ingredient in the volume-hologram-recording layer; and it is also possible to control the wavelength of the reconstructed beam in this manner. The present invention utilizes this means of controlling the wavelength of a reconstructed beam, which we ourselves have proposed.

The present invention provides a process for producing an original hologram film, comprising the steps of: preparing a hologram-recording film having a recording layer of a volume-hologram-recording photosensitive material in which a volume hologram has been recorded, and a film for controlling the wavelength of diffracted light, having a material layer containing an ingredient which can migrate to the recording layer to shift the diffraction peak wavelength for the volume hologram recorded in the recording layer; and affixing the film for controlling the wavelength of diffracted light to the hologram-recording film with the recording layer and the material facing each other.

The present invention also provides an original hologram film comprising: a recording layer of a volume-hologram-recording photosensitive material layer in which a volume hologram has been recorded; and a material layer laminated to the recording layer, wherein the material layer contains an ingredient which can migrate to the recording layer to shift the diffraction peak wavelength for the volume hologram recorded in the recording layer.

A photopolymer is used for forming the recording layer for use in the present invention. The material layer for use in the present invention is made from an adhesive agent. Polypropylene glycol is incorporated into the material layer as the ingredient that can migrate to the recording layer to shift the diffraction peak wavelength for the volume hologram recorded in the recording layer.

Also provided by the present invention is a process for duplicating a hologram, comprising the steps of: preparing an original hologram film including a recording layer of a volume-hologram-recording photosensitive material in which a volume hologram has been recorded by using a photographing beam having a predetermined wavelength, and a material layer laminated to the recording layer, containing an ingredient which can migrate to the recording layer to shift the diffraction peak wavelength for the volume hologram recorded in the recording layer; and placing a hologram-recording film on the original hologram film; and recording, in the hologram-recording film, the volume hologram that has been recorded in the original hologram film, by using a duplicating beam having a predetermined wavelength.

In the hologram duplication process of the present invention, a beam having the same wavelength as that of a photographing beam can be used as the duplicating beam. In this case, the ingredient having the above-described function is incorporated into the material layer in such an amount that the shift of the diffraction peak wavelength to be brought about due to the shrinkage of the recording layer can be compensated. Further, in the hologram duplication process according to the present invention, a beam having a wavelength different from that of a photographing beam can be used as the duplicating beam. In this case, the above specific ingredient is incorporated into the material layer in such an amount that not only the shift of the diffraction peak wavelength to be brought about due to the shrinkage of the recording layer but also one to be brought about due to the difference between the wavelength of the duplicating beam and that of the photographing beam can be compensated.

According to the present invention, an original hologram film is made by laminating, to a recording layer of a volume-hologram-recording photosensitive material in which a volume hologram has been recorded, a material layer containing an ingredient capable of migrating to the recording layer to shift the diffraction peak wavelength for the volume hologram recorded in the recording layer. Therefore, even in the case where the diffraction peak wavelength shifts due to, for instance, the shrinkage of the recording layer, it is possible to efficiently duplicate the original hologram without suffering from decrease in diffraction efficiency. Further, according to the present invention, it is also possible to duplicate a hologram by using a duplicating beam whose wavelength is different from that of a photographing beam. The duplication of a hologram can thus be conducted efficiently irrespective of the wavelength of a duplicating beam.

BRIEF DESCRIPTION OF THE DRAWINGS

By referring now to the accompanying drawings and the following embodiments, the present invention will be explained more specifically.

In the drawings.

DETAILED DESCRIPTION OF THE PREFERRED EMBODIMENTS

EMBODIMENT 1

<Recording of Volume Hologram>

Figure 1:
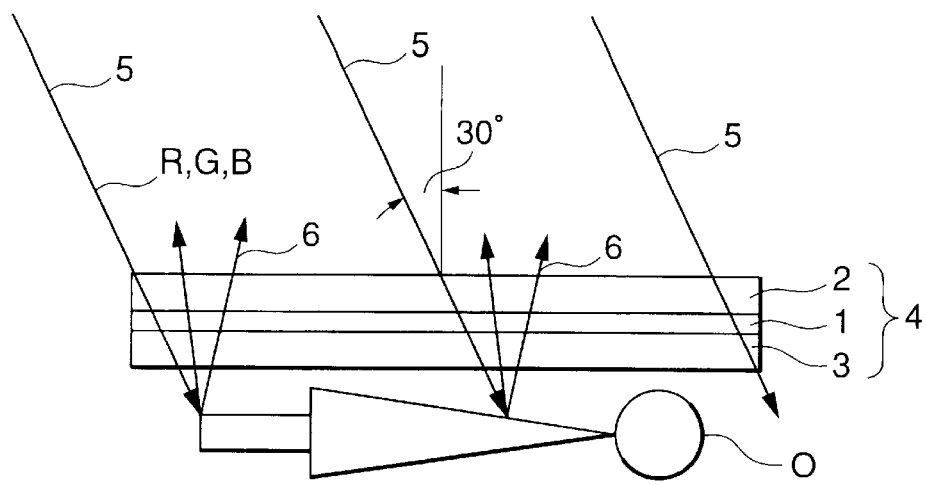
FIG. 1 is a view showing the arrangement of a hologram-recording film and an object, adopted for photographically recording a hologram in the first and second embodiments of the present invention.

As shown in FIG. 1, a light-scattering object O was placed in the vicinity of a hologram-recording film ("HRF 800× 001" manufactured by Du Pont, Inc.) 4, a laminate consisting of a polyethylene terephthalate film (PET film) 2 having a thickness of 50 μm, a hologram-recording photosensitive material (photopolymer) layer (recording layer) 1, and a polyvinyl chloride film 3. Illuminating light 5 including three wavelengths of red (R), green (G) and blue (B) was allowed to enter into the hologram-recording film 4 from the polyethylene terephthalate film 2 side at an incidence angle of 30 degrees. Scattered light 6 from the object O and the illuminating light 5, incident light, were allowed to interfere in the hologram-recording photosensitive material layer 1 to record therein a Denisyuk-type volume hologram. In this recording, a beam having a wavelength of 647 nm emitted by a Kr laser was used as R beam; a beam of 553 nm emitted by an Ar laser-excited dye laser, as G beam; and a beam of 457.9 nm from an Ar laser, as B beam. The luminous exposure of R beam was 12 mJ/cm$^2$; that of G beam was 3 mJ/cm$^2$; and that of B beam was 3 mj/cm$^2$. After the recording of the hologram was completed, the hologram-recording film 4 was exposed to 20 mJ/cm$^2$ of ultraviolet light.

Figure 5:
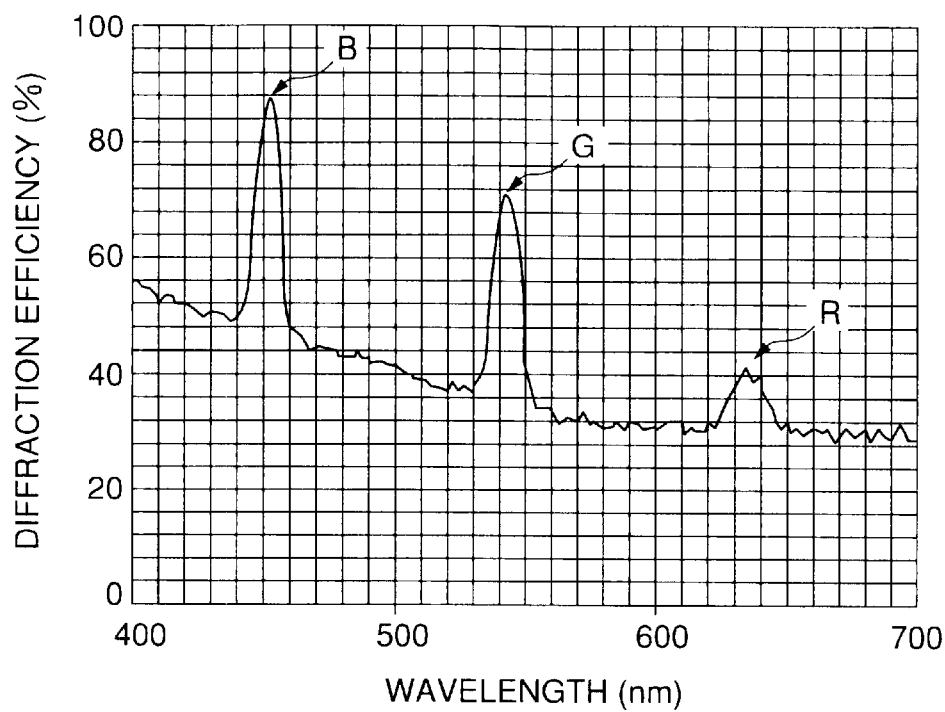
FIG. 5 is a chart showing the distribution of diffraction efficiencies of the hologram recording film in the first embodiment of the present invention.

The hologram-recording film 4 in which the volume hologram had been recorded in the above-described manner was baked at 120° C. for 2 hours, and subjected to the evaluation of its spectral properties. The distribution of diffraction efficiencies of the hologram is shown in FIG. 5. It is noted that the chart shown in FIG. 5 was obtained by converting the distribution of spectral transmittances determined by a spectrophotometer into the distribution of diffraction efficiencies. FIG. 5 shows that the diffraction peak wavelengths for the R, G and B holograms are respectively shifted to the shorter wavelength side in a quantity of approximately 10 nm.

<Preparation of Adhesive Film Consisting of Transparent Protective Film/Adhesive Layer/Silicon Separator>

An adhesive solution having the following composition was applied, by a comma coater, to a 50-μm thick silicon separator 7 ("SP-PET-05" manufactured by Tokyo Cellophane Co., Ltd., Japan) in such an amount that the resulting adhesive layer (material layer) 8 would have a thickness of 15 μm when dried.

(Composition of Adhesive Solution)

| | |
|---|---|
| Acrylic adhesive ("Nissetsu PE-118" manufactured by Nippon Carbide Industries, Co., Ltd., Japan) | 100 parts by weight |
| Methyl ethyl ketone | 30 parts by weight |
| Toluene | 15 parts by weight |
| Ethyl acetate | 15 parts by weight |
| Isocyanate crosslinking agent ("Nissetsu CK-101" manufactured by Nippon Carbide Industries, Co., Ltd., Japan) | 2 parts by weight |
| Polypropylene glycol (Mn 1,000) | 8 parts by weight |

Figure 2:
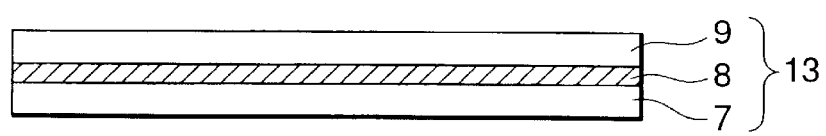
FIG. 2 is a view showing the layer structure of an adhesive layer (a film for controlling the wavelength of diffracted light) for use in the first and second embodiments of the present invention.

To this adhesive layer was laminated a polyethylene terephthalate film 9 having a thickness of 50 μm ("Lumirror T-60" manufactured by Toray Industries, Inc., Japan), thereby obtaining an adhesive film (film for controlling the wavelength of diffracted light) 13 as shown in FIG. 2.

<Preparation of Original Hologram Film>

Figure 3:
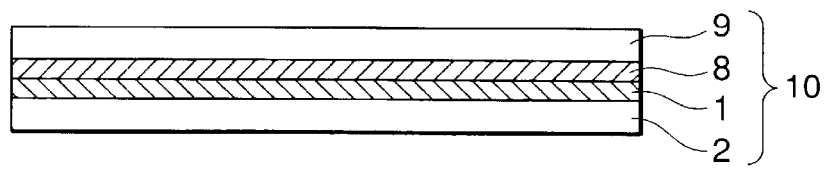
FIG. 3 is a view showing the layer structure of an original volume hologram film according to the first and second embodiments of the present invention.

The above-obtained hologram-recording film 4 from which the polyvinyl chloride film 3 had been separated, and the above-prepared adhesive film 13 from which the silicon separator 7 had been separated were laminated, as shown in FIG. 3, to obtain an original volume hologram film 10 of the present invention, consisting of the transparent protective film 9, the adhesive layer 8, the hologram-recording photosensitive material layer 1 and the PET film 2.

Figure 6:
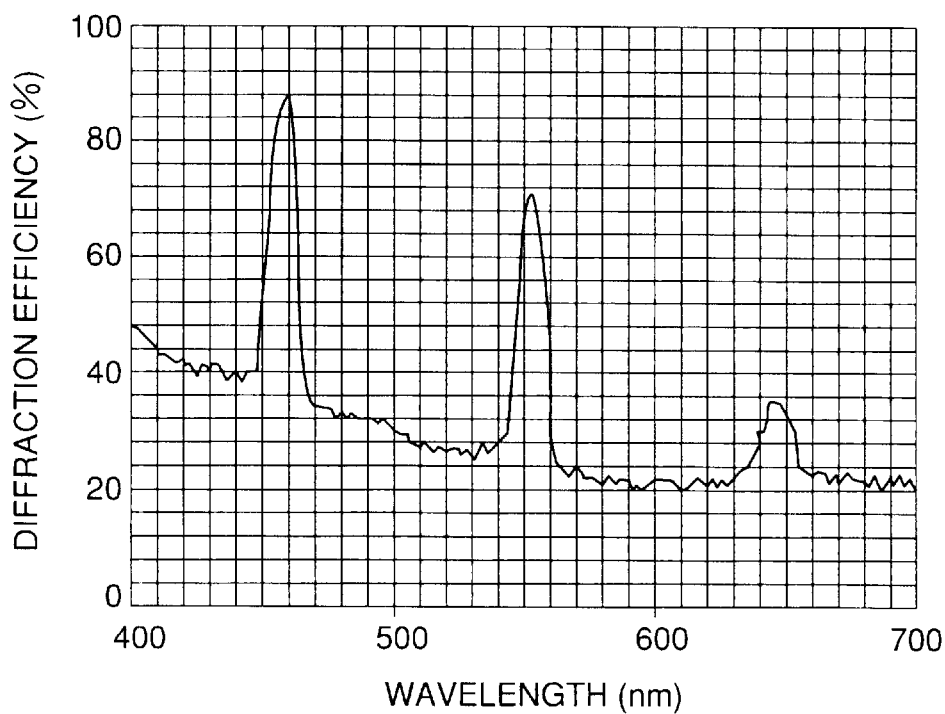
FIG. 6 is a chart showing the distribution of diffraction efficiencies of the original volume hologram film in the first embodiment of the present invention.

This original volume hologram film 10 was baked at 120° C. for 2 hours, and subjected to the evaluation of its spectral properties. As a result, the distribution of diffraction efficiencies was found to be as shown in FIG. 6. FIG. 6 shows that the diffraction peak wavelengths for the R, G and B holograms are respectively shifted to the longer wavelength side in a quantity of approximately 10 nm and that the peaks of the diffraction efficiencies are situated at wavelengths almost equal to those of the photographing beams (R: 647 nm, G: 553 nm, B: 457.9 nm). Among those ingredients contained in the adhesive layer 8, the ingredient that had migrated to the hologram-recording photosensitive material layer 1 was polypropylene glycol.

Figure 4:
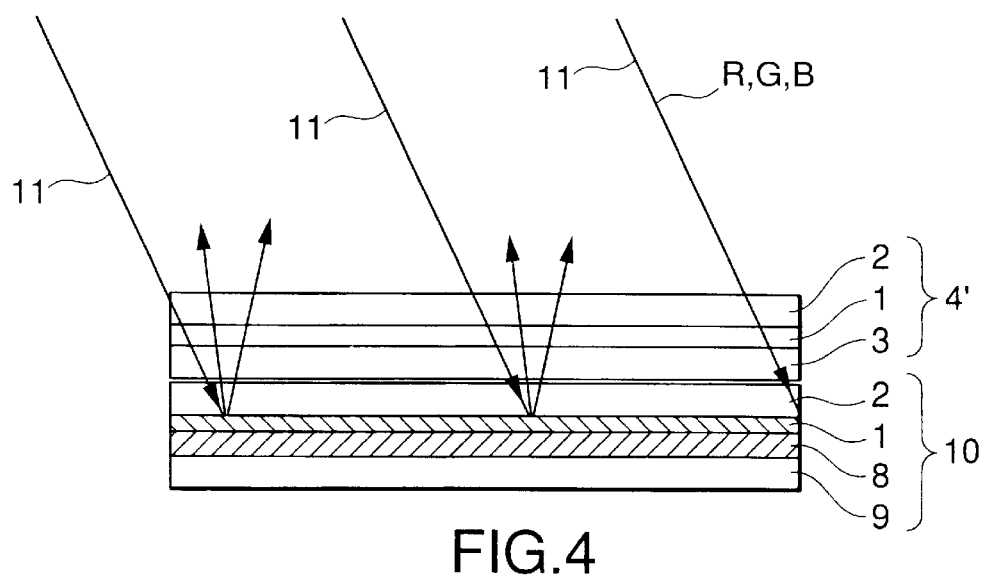
FIG. 4 is a view showing the arrangement of the original volume hologram film and a hologram-recording film, adopted for duplicating the original hologram in the first and second embodiments of the present invention.

As shown in FIG. 4, another hologram-recording film ("HRF 800x001" manufactured by Du Pont Inc.) 4' was brought into close contact with the above-obtained original volume hologram film 10. Duplicating light 11 including three wavelengths of R, G and B which were the same as those of the photographing beams was allowed to enter into this combination from the hologram-recording film 4' side at an incidence angle of 30 degrees. This incidence angle was equal to that of the illuminating light 5 at the time of the recording of the original hologram. Diffracted light 12 from the original volume hologram film 10 and the incident light 11 were thus allowed to interfere in the hologram-recording film 4', whereby the duplication of the original hologram was able to be efficiently attained.

EMBODIMENT 2

<Recording of Volume Hologram>

As shown in FIG. 1, a light-scattering object O was placed in the vicinity of a hologram-recording film ("HRF 800x001" manufactured by Du Pont, Inc.) 4, a laminate consisting of a polyethylene terephthalate film (PET film) 2 having a thickness of 50 μm, a hologram-recording photosensitive material (photopolymer) layer (recording layer) 1, and a polyvinyl chloride film 3. Illuminating light 5 consisting only of blue (B) beam having a wavelength of 457.9 nm emitted by an Ar laser was allowed to enter into this hologram-recording film 4 from the polyethylene terephthalate film 2 side at an incidence angle of 30 degrees. Scattered light 6 from the object O and the illuminating light 5, incident light, were allowed to interfere in the hologram-recording photosensitive material layer 1 to record therein a Denisyuk-type volume hologram. The luminous exposure of the illuminating light 5 used for this recording was 20 mJ/cm$^2$. After the recording of the hologram was completed, the hologram-recording film 4 was exposed to 20 mJ/cm$^2$ of ultraviolet light.

<Preparation of Adhesive Film Consisting of Transparent Protective Film/Adhesive Layer/Silicon Separator>

An adhesive solution having the following composition was applied, by a comma coater, to a 50-μm thick silicon separator 7 ("SP-PET-05" manufactured by Tokyo Cellophane Co., Ltd., Japan) in such an amount that the resulting adhesive layer (material layer) 8 would have a thickness of 15 μm when dried.

(Composition of Adhesive Solution)

| | |
|---|---|
| Acrylic adhesive ("Nissetsu PE-118" manufactured by Nippon Carbide Industries, Co., Ltd., Japan) | 100 parts by weight |
| Methyl ethyl ketone | 30 parts by weight |
| Toluene | 15 parts by weight |
| Ethyl acetate | 15 parts by weight |
| Isocyanate crosslinking agent ("Nissetsu CK-101" manufactured by Nippon Carbide Industries, Co., Ltd., Japan) | 2 parts by weight |
| Polypropylene glycol (Mn 1,000) | 28 parts by weight |

To this adhesive layer was laminated a polyethylene terephthalate film 9 having a thickness of 50 μm ("Lumirror T-60" manufactured by Toray Industries, Inc., Japan), thereby obtaining an adhesive film (film for controlling the wavelength of diffracted light) 13 as shown in FIG. 2.

<Preparation of Original Hologram Film>

The above-obtained hologram-recording film 4 from which the polyvinyl chloride film 3 had been separated, and the above-prepared adhesive film 13 from which the silicon separator 7 had been separated were laminated, as shown in FIG. 3, to obtain an original volume hologram film 10 of the present invention, consisting of the transparent protective film 9, the adhesive layer 8, the hologram-recording photosensitive material layer 1 and the PET film 2.

This original volume hologram film 10 was baked at 120° C. for 2 hours, and subjected to the evaluation of its spectral properties. As a result, it was found that the diffraction peak wavelength had been shifted to the longer wavelength side in a quantity of approximately 28 nm and that the peak of the diffraction efficiency was situated in the vicinity of 476 nm. Among those ingredients contained in the adhesive layer 8, the ingredient that had migrated to the hologram-recording photosensitive material layer 1 was polypropylene glycol.

As shown in FIG. 4, another hologram-recording film ("HRF 800x001" manufactured by Du Pont Inc.) 4' was brought into close contact with the above-obtained original volume hologram film 10. A duplicating beam 11 having a wavelength of 476.9 nm different from that of the photographing beam was allowed to enter into this combination from the hologram-recording film 4' side at an incidence angle of 30 degrees. This incidence angle was equal to that of the illuminating light 5 at the time of the recording of the original hologram. Diffracted light 12 from the original volume hologram film 10 and the incident light 11 were thus allowed to interfere in the hologram-recording film 4', whereby the duplication of the original hologram was able to be efficiently attained.

The present invention has been described by referring to the above embodiments. However, the present invention is, of course, not limited to these embodiments, and encompasses various modifications thereof.

It is also possible to freely control the quantity of the shift of the diffraction peak wavelength to the longer wavelength side by changing the amount of the migrating ingredient to be incorporated into the adhesive layer. Further, the adhesive layer can be affixed not only to one side but also both sides of the hologram-recording photosensitive material layer.

In addition, another layer, such as an adhesive layer, an optical adhesive layer, a polymer film layer or a glass layer, can be provided on the PET 2 side of the hologram-recording photosensitive material 1. Furthermore, it is not necessary that the diffraction peak wavelength of the original volume hologram film 10 completely agrees with the wavelength of the duplicating beam, since some amount of shift of the diffraction peak wavelength can be corrected by changing the incidence angle of the duplicating beam.

What is claimed is:

1. A process for producing an original hologram film, comprising the steps of:

preparing a hologram-recording film having a recording layer of a volume-hologram-recording photosensitive material in which a volume hologram has been recorded, and a film for controlling a wavelength of diffracted light, having an adhesive material layer that comprises an adhesive agent and an ingredient that can migrate to the recording layer to shift a diffraction peak wavelength for the volume hologram recorded in the recording layer; and affixing the film for controlling the wavelength of diffracted light to the hologram-recording film with the recording layer and the material layer facing each other.

2. The process for producing an original hologram film according to claim 1, wherein the recording material layer is made from a photopolymer.

3. The process for producing an original hologram film according to claim 1, wherein the ingredient contained in the material layer is polypropylene glycol.

4. An original hologram film comprising:

a recording layer of a volume-hologram-recording photosensitive material in which a volume hologram has been recorded; and an adhesive material layer laminated to the recording layer, wherein the adhesive material layer comprises an adhesive agent and an ingredient that can migrate to the recording layer to shift a diffraction peak wavelength for the volume hologram recorded in the recording layer.

5. The original hologram film according to claim 4, wherein the recording layer is made from a photopolymer.

6. The original hologram film according to claim 4, wherein the ingredient contained in the material layer is polypropylene glycol.

7. A process for duplicating a hologram, comprising the steps of:

preparing an original hologram film including a recording layer of a volume-hologram-recording photosensitive material in which a volume hologram has been recorded by using a photographing bean having a predetermined wavelength, and an adhesive material layer laminated to the recording layer, containing an adhesive agent and an ingredient that can migrate to the recording layer to shift a diffraction peak wavelength for the volume hologram recorded in the recording layer;

placing a hologram-recording film on the original hologram film, and recording, in the hologram-recording film, the volume hologram that has been recorded in the original hologram film, by using a duplicating beam having a predetermined wavelength.

8. The process for duplicating a hologram according to claim 7, wherein a beam having the same wavelength as that of the photographing beam is used as the duplicating beam, and the material layer contains the ingredient in such an amount that a shift of the diffraction peak wavelength to be brought about due to a shrinkage of the recording layer can be compensated.

9. The process for duplicating a hologram according to claim 7, wherein a beam having a wavelength different from that of the photographing beam is used as the duplicating beam, and the material layer contains the ingredient in such an amount that not only the shift of the diffraction peak wavelength to be brought about due to a shrinkage of the recording layer but also one to be brought about due to a difference between the wavelength of the duplicating beam and that of the photographing beam can be compensated.

10. The original hologram film according to claim 4, further comprising an additional material layer laminated to the opposite side of the recording layer from the material layer, said additional material layer containing an ingredient that can migrate to the recording layer to shift a diffraction peak wavelength for the volume hologram recorded in the recording layer.

* * * * *